US012392247B2

(12) United States Patent
Kim et al.

(10) Patent No.: US 12,392,247 B2
(45) Date of Patent: Aug. 19, 2025

(54) AIRFOIL WITH SANDWICH COMPOSITE FLANGE

(71) Applicant: RAYTHEON TECHNOLOGIES CORPORATION, Farmington, CT (US)

(72) Inventors: Russell Kim, Temecula, CA (US); Raymond Surace, Newington, CT (US); James T. Roach, Vernon, CT (US); Jonas Banhos, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 45 days.

(21) Appl. No.: 18/328,217

(22) Filed: Jun. 2, 2023

(65) Prior Publication Data

US 2024/0401485 A1 Dec. 5, 2024

(51) Int. Cl.
*F01D 5/00* (2006.01)
*F01D 5/28* (2006.01)

(52) U.S. Cl.
CPC .......... *F01D 5/282* (2013.01); *F05D 2230/50* (2013.01); *F05D 2300/6033* (2013.01)

(58) Field of Classification Search
CPC ................................ F01D 5/282; F01D 5/284
See application file for complete search history.

(56) References Cited

U.S. PATENT DOCUMENTS

| | | | |
|---|---|---|---|
| 9,370,921 B2 | 6/2016 | Butler et al. | |
| 10,695,958 B2 | 6/2020 | Thomas et al. | |
| 2019/0368363 A1* | 12/2019 | Walston | F01D 25/005 |
| 2021/0003016 A1* | 1/2021 | Theertham | F01D 5/147 |

FOREIGN PATENT DOCUMENTS

| | | |
|---|---|---|
| EP | 3677749 A2 | 7/2020 |
| EP | 3693548 A1 | 8/2020 |
| EP | 4006307 A2 | 6/2022 |
| EP | 4047185 A1 | 8/2022 |
| EP | 4134357 A1 | 2/2023 |

OTHER PUBLICATIONS

European Search Report for European Patent Application No. 24179133.4 mailed Oct. 29, 2024.

* cited by examiner

*Primary Examiner* — Katheryn A Malatek
(74) *Attorney, Agent, or Firm* — Carlson, Gaskey & Olds, P.C.

(57) ABSTRACT

An airfoil for a gas turbine engine includes an airfoil section and a platform that has a non-gaspath side, a flange that extends from the non-gaspath side, and a gaspath side from which the airfoil section extends. The flange is comprised of a sandwich composite that includes first and second ceramic matrix composite (CMC) skins that each have at least one 2-D ceramic fiber ply, and a cellular core disposed between the first and second CMC skins.

14 Claims, 5 Drawing Sheets

AIRFOIL WITH SANDWICH COMPOSITE FLANGE

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

An airfoil for a gas turbine engine according to an example of the present disclosure includes an airfoil section and a platform having a gaspath side and a non-gaspath side. A flange extends from the non-gaspath side, and the airfoil section extends from the gaspath side. The flange is comprised of a sandwich composite that has first and second ceramic matrix composite (CMC) skins each including at least one 2-D ceramic fiber ply, and a cellular core disposed between the first and second CMC skins.

In a further embodiment of any of the foregoing embodiments, the first and second CMC skins include, respectively, first and second radially upturned tabs that extend in the flange, and the cellular core is disposed between the first and second radially upturned tabs.

In a further embodiment of any of the foregoing embodiments, the cellular core includes a base portion that extends in the platform adjacent the flange and a ridge that radially protrudes from the base portion and extends between the first and second radially upturned tabs.

In a further embodiment of any of the foregoing embodiments, the sandwich composite includes a third CMC skin including at least one 2-D ceramic fiber ply on the gaspath side of the platform, with the cellular core being radially disposed between the third CMC skin and each of the first and second CMC skins.

In a further embodiment of any of the foregoing embodiments, the flange defines a radial flange face, and the ridge defines a radial ridge face proximate the radial flange face.

In a further embodiment of any of the foregoing embodiments, the first radially upturned tab is axially forward of the second radially upturned tab.

In a further embodiment of any of the foregoing embodiments, the base portion of the cellular core defines an axial length in the platform and the ridge defines a radial thickness at the flange, and the axial length is greater than the radial thickness.

In a further embodiment of any of the foregoing embodiments, the cellular core is selected from the group consisting of a honeycomb, a foam, a ceramic felt, a 3-D fabric, a monolithic ceramic grid, and combinations thereof.

In a further embodiment of any of the foregoing embodiments, the cellular core is selected from the group consisting of a honeycomb, a foam, a monolithic ceramic grid, and combinations thereof.

In a further embodiment of any of the foregoing embodiments, the cellular core includes cells that are void.

In a further embodiment of any of the foregoing embodiments, the cellular core includes cells that contain a filler material.

A gas turbine engine according to an example of the present disclosure includes a compressor section, a combustor in fluid communication with the compressor section, and a turbine section in fluid communication with the combustor. The turbine section has an airfoil in accordance with any of the preceding embodiments.

A method for fabricating an airfoil for a gas turbine engine according to an example of the present disclosure includes providing a core blank made of a cellular material, shaping the core blank into a cellular core, and forming a fiber preform that has an airfoil section and a platform by laying-up first and second ceramic fiber ply skins on the cellular core such that in a flange on the platform the cellular core is sandwiched between the first and second ceramic fiber ply skins. The fiber preform is then densified with a ceramic matrix. The first and second ceramic fiber ply skins each have at least one 2-D ceramic fiber ply.

In a further embodiment of any of the foregoing embodiments, the core blank is selected from the group consisting of a honeycomb, a foam, a ceramic felt, a 3-D fabric, a monolithic ceramic grid, and combinations thereof.

In a further embodiment of any of the foregoing embodiments, the shaping includes machining the core blank.

In a further embodiment of any of the foregoing embodiments, the machining forms a ridge on the cellular core, and the first and second ceramic fiber ply skins conform to the ridge.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

Figure 1:
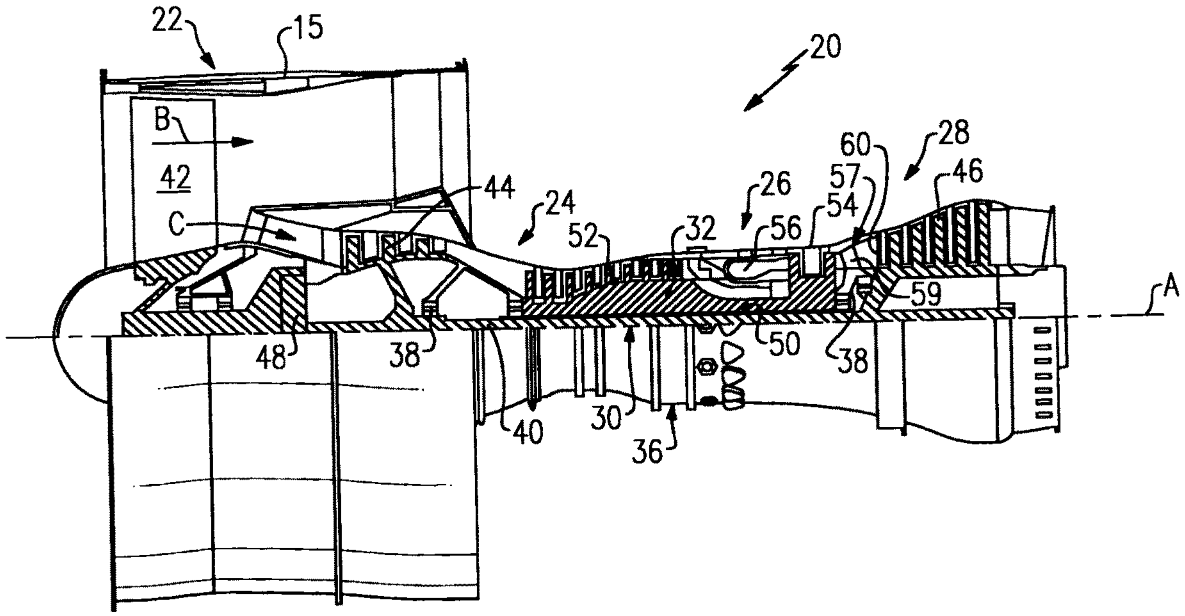
FIG. 1 illustrates a gas turbine engine.

In this disclosure, like reference numerals designate like elements where appropriate and reference numerals with the addition of one-hundred or multiples thereof designate modified elements that are understood to incorporate the same features and benefits of the corresponding elements. Terms such as "first" and "second" used herein are to differentiate that there are two architecturally distinct components or features. Furthermore, the terms "first" and "second" are interchangeable in that a first component or feature could alternatively be termed as the second component or feature, and vice versa.

DETAILED DESCRIPTION

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(\text{Tram } ^\circ \text{R})/(518.7^\circ \text{R})]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
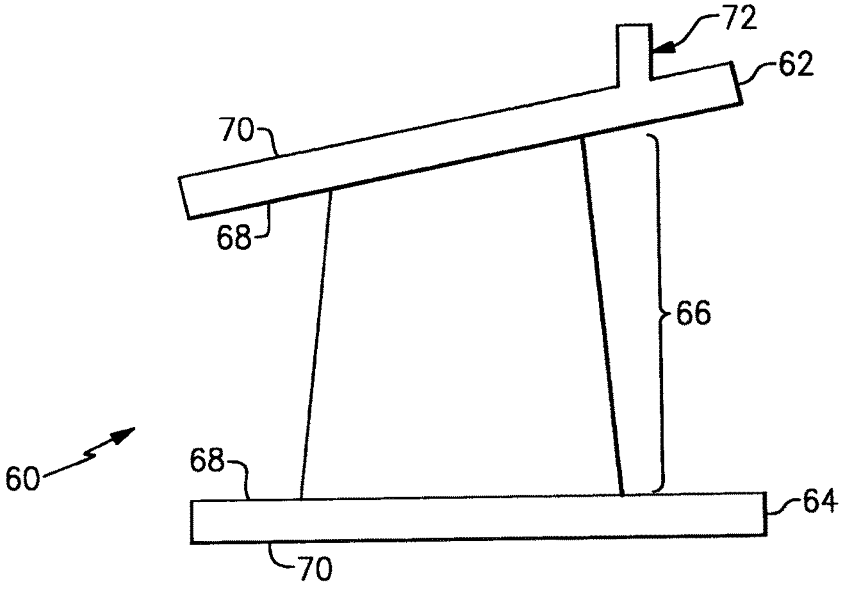
FIG. 2 illustrates an airfoil from the turbine section of the engine.

FIG. 2 illustrates an airfoil 60 from the engine 20. To demonstrate an example implementation in accordance with this disclosure, the article 60 is depicted as a turbine vane from the turbine section 28 of the engine 20. A plurality of the turbine vanes are arranged in a circumferential row about the engine central longitudinal axis A. It is to be understood, however, that the airfoil 60 is not limited to vanes and that the examples herein may also be applied to turbine blades.

The turbine vane is comprised of several sections, including first and second platforms 62/64 and an airfoil section 66 that extends between the platforms 62/64. Each platform 62/64 has a gaspath side 68 and a non-gaspath side 70. The gaspath side 68 bounds a portion of the core flow path C of the engine 20, while the non-gaspath side 70 is the opposite side that faces away from the core flow path C. The airfoil section 66 extends between the gaspath sides 68 and generally defines a leading edge, a trailing edge, and pressure and suction sides. In this example, the first platform 62 is a radially outer platform and the second platform 64 is a radially inner platform. The first platform 62 includes a flange 72 that projects radially from the non-gaspath side 70 surface of the platform 62. The flange 72 serves to support the airfoil 60 in the engine 20. For example, the airfoil 60 is supported between inner and outer fixed structures, such as inner and outer engine case structures. As will be appreciated, the second platform 64 could additionally or alternatively have a flange.

Airfoils that are made of ceramic matrix composite ("CMC") materials must be designed with a geometry that is aerodynamically efficient and that can be mounted in the engine without over-stressing but that is also manufacturable from the CMC material. Such a balance has proven challenging, as many features that are known for use in metallic alloy vanes are unfeasible in CMC airfoils either because they cannot be manufactured or because they result in stresses that are higher than desired for given durability requirements. Furthermore, as designs for ceramic airfoils evolve and improve, the geometry challenges the limits of CMC component manufacturability. For instance, a CMC airfoil may be formed of a lay-up of ceramic fabric plies to form a preform. The preform is then subjected to a densification process to form the ceramic matrix. Such a densification process may include, but is not limited to, chemical vapor infiltration, melt infiltration, or polymer infiltration and pyrolysis. In these regards, the densification depends to some extent on the ability of the matrix material or matrix precursor material (i.e., infiltrants) to flow into all depths of the preform during the densification process so that the preform becomes fully densified. In some cases, however, the thickness of the preform, such as at a flange, exceeds a depth at which the infiltrants can readily flow under practical processing conditions and times and achieve the desired density. As a result, the preform becomes only partially densified, with pores or voids in the regions that the infiltrant cannot reach. To facilitate addressing this issue, the platforms 62/64 of the airfoil 60 are made from a sandwich composite. As will be described below, the sandwich composite enables use of a thicker wall while eliminating or reducing concerns over partial densification.

Figure 3:
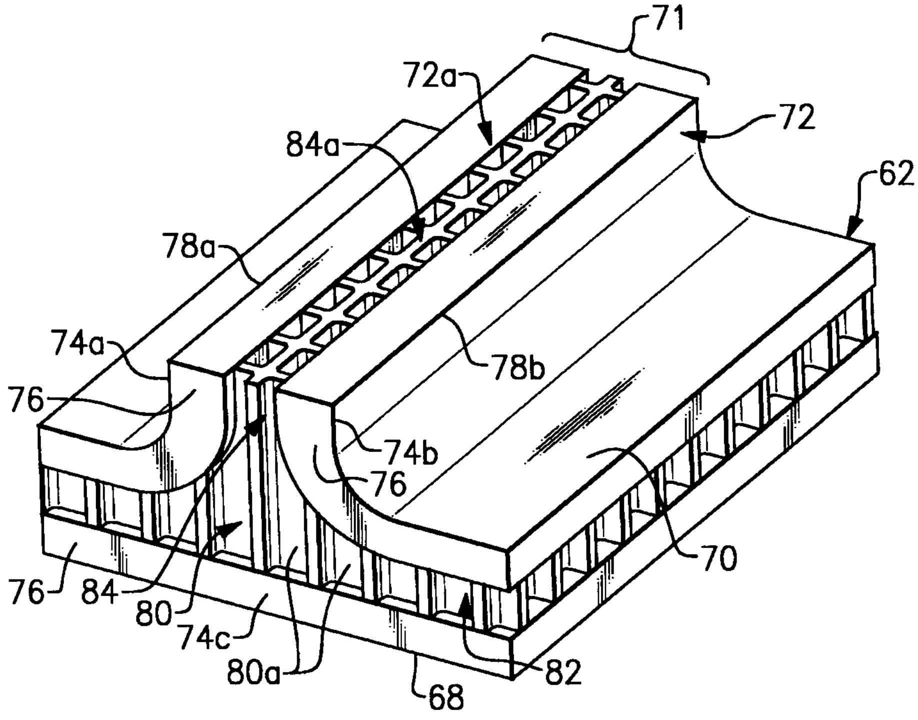
FIG. 3 illustrates a sandwich composite of the airfoil.

FIG. 3 illustrates a representative portion of the airfoil 60, sectioned through the platform 62 and the flange 72. Although not shown, the platform 64 may be of the same construction. The flange 72 is comprised of a sandwich composite 71. A sandwich composite is a composite material that has a cellular core disposed between two generally thin face skins, where the skins and the cellular core are of different materials in terms of the material architecture, though the chemical compositions may be the same or similar between the skins and core.

In the example depicted, the sandwich composite 72 includes first and second ceramic matrix composite (CMC) skins 74*a*/74*b*. Each CMC skin 74*a*/74*b* includes at least one 2-D ceramic fiber ply 76. In a 2-D ceramic fiber ply, the ceramic fibers or tows are interlaced in only two directions. Example ceramic materials of the CMC include silicon-containing ceramic, such as but not limited to, silicon carbide (SiC) and/or silicon nitride ($Si_3N_4$). A CMC is formed of ceramic fiber tows that are disposed in a ceramic matrix. As an example, the CMC may be, but is not limited to, a SiC/SiC composite in which SiC fiber tows are disposed within a SiC matrix.

The CMC skins 74*a*/74*b* are disposed on the non-gaspath side 70 of the platform 62, opposite a third CMC skin 74*c* (also including at least one 2-D ceramic fiber ply 76) on the gaspath side 68. The CMC skins 74*a*/74*b* generally extend axially and circumferentially along the non-gaspath side 70 and include first and second radially upturned tabs 78*a*/78*b* that extend in the flange 72. In the illustrated example, the first radially upturned tab 78*a* is axially forward of the second radially upturned tab 78*b*. A cellular core 80 is disposed between the first and second CMC skins 74*a*/74*b* and, in particular, between the radially upturned tabs 78*a*/78*b*. The cellular core 80 is also between each of the CMC skins 74*a*/74*b* and the CMC skin 74*c*. In this regard, the sandwich composite 72 may also be considered to include the third CMC skin 74*c*. A cellular core 80 is a material that has a cellular macro-architecture, such as but not limited to, an open or closed cell foam that has random irregularly shaped cells, a honeycomb that has uniformly shaped cells (e.g., circular, hexagonal, etc.), or a fibrous material in which the interstices between fiber tows define cells. In the illustrated example, the cellular core 80 is of the honeycomb type and defines an array of cells 80*a* that are void, i.e., empty, although in some examples the cells 80*a* may be filled or partially filled.

Figure 4:
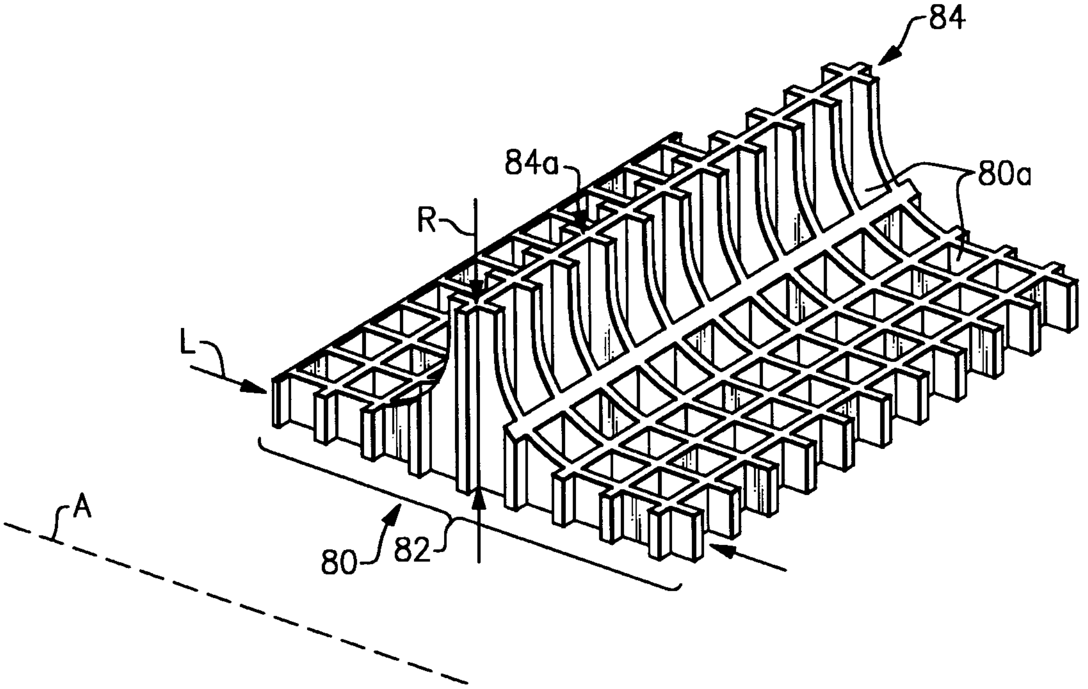
FIG. 4 illustrates a cellular core of the sandwich composite.

FIG. 4 illustrates isolated view of the cellular core 80. In this example, the cells 80*a* are rectangular (e.g., square), are open radially at both ends, and are of uniform cross-sectional size throughout the array. The cross-sectional shape of the cells 80*a*, however, may alternatively be another polygonal shape, circular, or oval. Additionally, the size of the cells 80*a* may be varied across the array. For instance, in one region of the flange 72 or of the platform 62 the cells 80*a* may be of relatively smaller size and in another region of the flange 72 or of the platform 62 the cells 80 may be of a relatively larger size. The size and shape of the cells 80*a* may be selected to locally tailor the properties of the cellular core 80 (and thus also the flange 72 and platform 62). Additionally, the cellular core 80 could be excluded in some regions of the flange and/or platform 62, while other regions of the flange 72 and/or platform 62 include the core 80.

As shown, the cellular core 80 includes a base portion 82 that extends in the platform 62 adjacent the flange 72 and a ridge 84 that radially protrudes from the base portion 82. The ridge 84 extends between the radially upturned tabs 78*a*/78*b*. The flange 72 defines a radial flange face 72*a*. The ridge 84 defines a radial ridge face 84*a* proximate the radial flange face 72*a*. For example, the radial ridge face 84*a* is flush or substantially flush with the radial flange face 72*a* such that the open ends of the cells 80*a* are exposed. In this regard, the open ends of the cells may serve as inlet for cooling air into the airfoil 60. Alternatively, the ridge 84 may stop short of the radial flange face 72*a* such that the radial ridge face 84*a* is radially offset from the radial flange face 72*a*. In that case, one or both the CMC skins 74*a*/74*b* may be draped over the radial ridge face 84*a* so that the open ends of the cells 80*a* are covered.

Unlike a filler material that may be used only in the space where fiber plies turn, the base portion 82 of the cellular core 80 extends in the platform 62, thereby anchoring the flange 72. In this regard, the base portion 82 of the cellular core 80 defines an axial length (L) in the platform 62 and the ridge 84 defines a radial thickness (R) at the flange 72, and the axial length (L) is greater than the radial thickness (R). For instance, L is greater than R by a factor of at least two.

Figure 5:
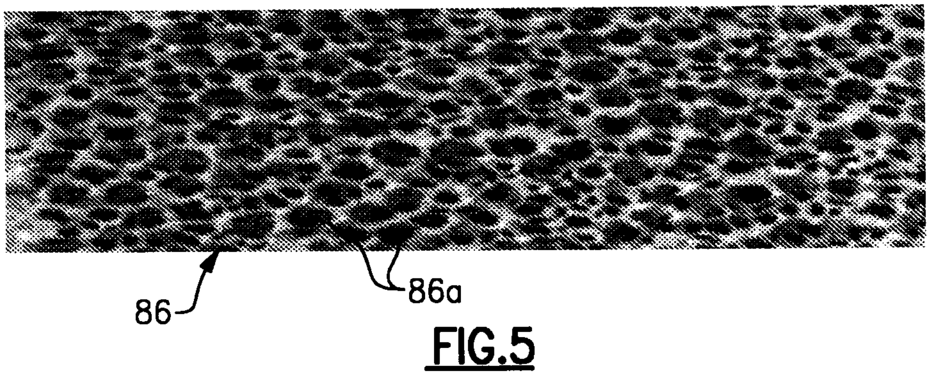
FIG. 5 illustrates a foam of a cellular core.
Figure 6:
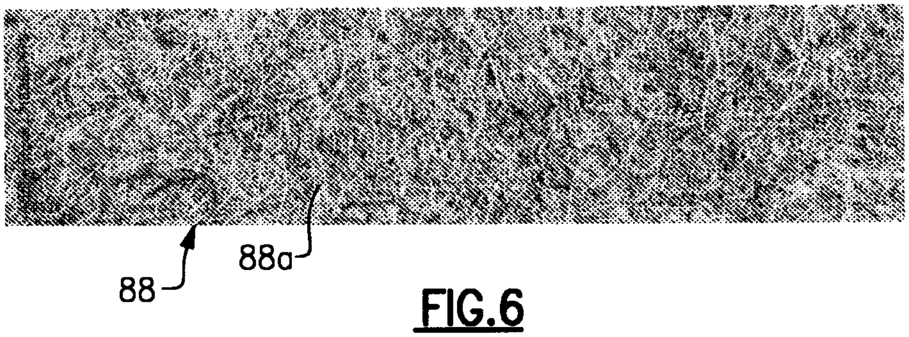
FIG. 6 illustrates a ceramic felt of a cellular core.
Figure 7:
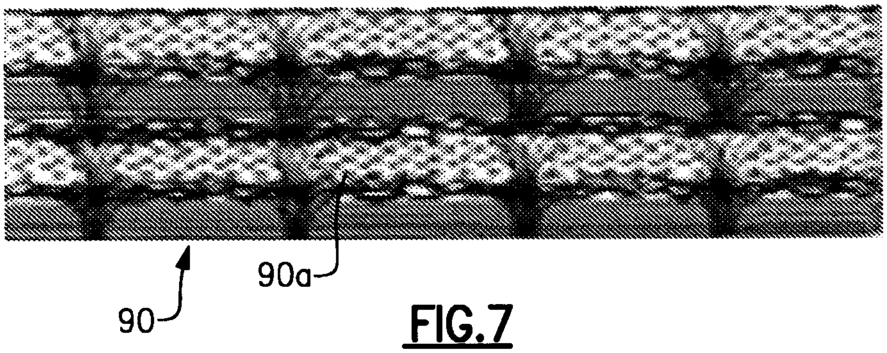
FIG. 7 illustrates a 3-D fabric of a cellular core.
Figure 8:
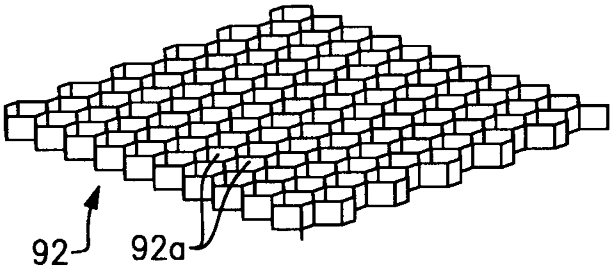
FIG. 8 illustrates a monolithic ceramic honeycomb of a cellular core.

The cellular core 80 of the examples herein may be formed of a material selected from a honeycomb, a foam, a ceramic felt, a 3-D fabric, a monolithic ceramic grid, or combinations thereof. For instance, the cellular core 80 above with the rectangular cells 80*a* may be formed from a layup of 2-D ceramic fabric that is constructed into the honeycomb shape and then densified with ceramic matrix. If not formed to net shape, the cellular core 80 may be machined to the desired profile. Alternatively, the cellar core 80 is a foam 86 with cells 86*a* as shown in FIG. 5; a ceramic felt 88 with cells 88*a* as shown in FIG. 6; a 3-D fabric 90 with cells 90*a* (between fiber tows) as shown in FIG. 7; or a monolithic ceramic grid 92 with cells 92*a* as shown in FIG. 8. In further examples, the foam 86 is a ceramic foam or reticulated vitreous carbon foam.

Figure 9:
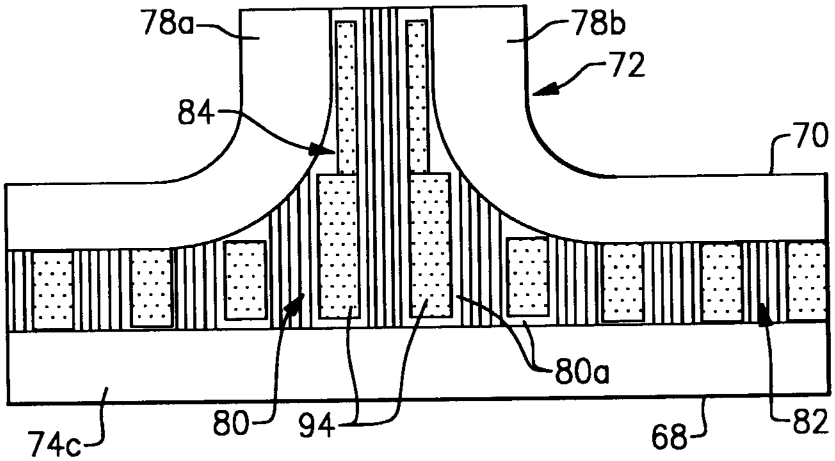
FIG. 9 illustrates a cellular core with a filler material in the cells.

As indicated previously, the cells 80*a* may be void (empty). However, as shown in FIG. 9, the cells 80*a* may alternatively include a filler material 94 that fully or partially fills the volume of the cells 80*a*. For example, the filler material 94 is a monolithic ceramic or a fibrous ceramic. The filler material 94 may serve to reinforce the cellular core 80, thus providing additional mechanical properties to the platform 62 and/or flange 72. As will be appreciated, all of the cells 80*a* need not include the filler material 94, and the filler material 94 may be provided selectively in only the cells 80*a* in the flange 72.

Figure 10:
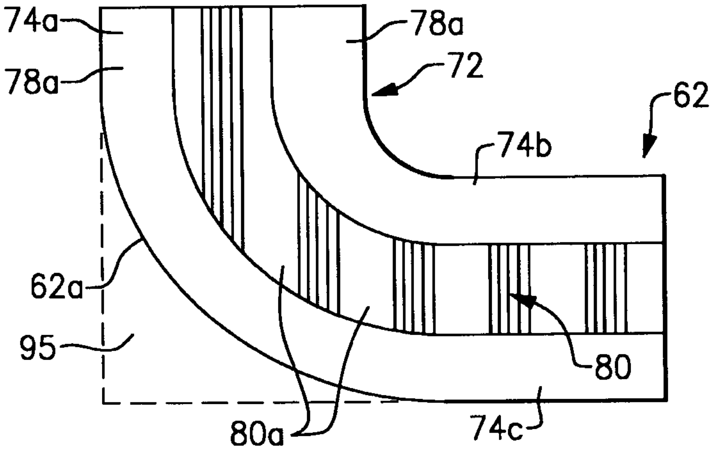
FIG. 10 illustrates a flange with an "L" joint configuration.

In the previous examples, the flange 72 is configured as a "T" joint in that the platform 62 extends both fore and aft of the flange 72, i.e., the flange 72 is offset from the edges of the platform 62. As shown in FIG. 10, the flange 72 may alternatively be configured as an "L" joint in which the platform 62 extends only fore or only aft of the flange 72. In this case, the third CMC skin 74*c* curves radially and forms an edge face 62*a* of the platform 62, i.e., the flange 72 is situated at the edge of the platform 62. Optionally, the corner region 95 delimited by dashed lines may include a filler material made of additional CMC plies, a noodle (i.e., a bundle of fiber tows), or a noodle that is overwrapped with additional CMC plies (although the filler material may exceed the depicted bounds of the corner region 95).

Figure 11:
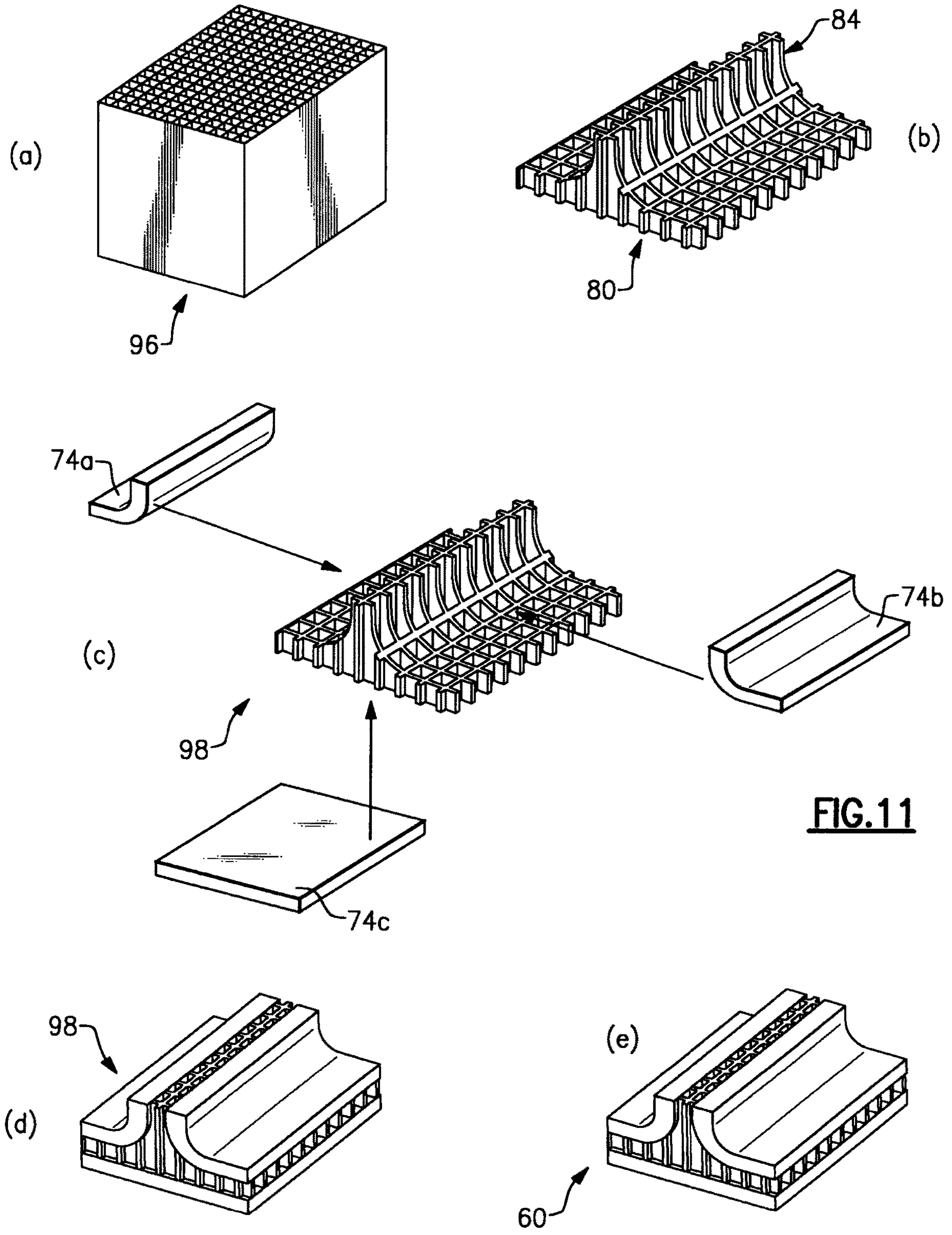
FIG. 11 illustrates a method for fabricating an airfoil with a sandwich composite.

FIG. 11 depicts a method for fabricating the airfoil 60 of the prior examples. At stage (a) a core blank 96 made of the cellular material is provided. For instance, the core blank 96 is selected from a honeycomb, a foam, a ceramic felt, a 3-D fabric, a monolithic ceramic grid, or combinations thereof, as also discussed above. The core blank 96 may be preformed as a block, for example. Techniques for fabricating the core blank 96 are not particularly limited and may include, but are not limited to, ply layup, 3-D printing, 3-D weaving, or milling or ultrasonic impact machined monolithic ceramic.

At stage (b) the core blank 96 is shaped into the cellular core 80. For instance, the shaping includes machining or cutting the core blank 96 to the desired geometry of the cellular core 80, including forming the afore-mentioned ridge 84. At stage (c) a fiber preform 98 is formed by laying-up ceramic fiber ply skins 74*a*/74*b*/74*c* (i.e., the fiber plies prior to densification to form the CMC skins 74*a*/74*b*/74*c*) on the cellular core 80 such that the cellular core 80 is sandwiched between the skins 74*a*/74*b*/74*c*. At stage (d) the fiber preform 98 is densified with a ceramic matrix to form the airfoil 60 at stage (e). For instance, although not limited, the densification may include, polymer infiltration and pyrolysis, slurry infiltration, melt infiltration, or chemical vapor infiltration. Machining or other finishing process may be conducted after densification.

The cellular core 80 facilitates densification in that the cells 80*a* of the core 80, to the extent they are open, provide pathways for flow of ceramic matrix material or precursor material, enabling full densification of the fiber ply skins 74*a*/74*b*/74*c*. In this manner, issues of infiltration through a thick wall for densification are avoided, yet the platform 62 and flange 72 can still be of substantial thickness. Of course, if the cells are closed or pre-filled with the filler material 94, such pathways may be limited. In some instances, it may be desirable to control or limit flow through the cells 80*a* during densification. In this regard, the filler material 94 may be used to limit or control flow and/or a densification process may be selected for tailoring flow. As an example, chemical vapor infiltration may not infiltrate as readily as slurry or melt infiltration and may be used in conjunction with the filler material 94 to reduce flow into or through the cells 80*a*.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil for a gas turbine engine comprising:

an airfoil section; and a platform having a non-gaspath side, a flange extending from the non-gaspath side, and a gaspath side from which the airfoil section extends, the flange being comprised of a sandwich composite including first and second ceramic matrix composite (CMC) skins each including at least one 2-D ceramic fiber ply, and a cellular ceramic core disposed between the first and second CMC skins, and the cellular ceramic core is selected from the group consisting of a ceramic honeycomb, a ceramic foam, a ceramic felt, a monolithic ceramic grid, and combinations thereof;

wherein the first and second CMC skins include, respectively, first and second radially upturned tabs extending in the flange, the cellular core including a base portion extending in the platform adjacent the flange and a ridge radially protruding from the base portion and extending between the first and second radially upturned tabs, the base portion having a maximum axial length in the platform and the ridge having a maximum radial thickness at the flange, and the axial length is greater than the radial thickness by a factor of at least 2.

2. The airfoil as recited in claim 1, wherein the sandwich composite includes a third CMC skin including at least one 2-D ceramic fiber ply on the gaspath side of the platform, with the cellular ceramic core being radially disposed between the third CMC skin and each of the first and second CMC skins.

3. The airfoil as recited in claim 1, wherein the flange defines a radial flange face, and the ridge defines a radial ridge face proximate the radial flange face.

4. The airfoil as recited in claim 1, wherein the first radially upturned tab is axially forward of the second radially upturned tab.

5. The airfoil as recited in claim 1, wherein the cellular ceramic core is selected from the group consisting of the ceramic honeycomb, the ceramic foam, the monolithic ceramic grid, and combinations thereof.

6. The airfoil as recited in claim 1, wherein the cellular ceramic core includes cells that are void.

7. The airfoil as recited in claim 1, wherein the cellular ceramic core is the ceramic honeycomb including honeycomb side walls that define and circumscribe uniformly-shaped cells.

8. A gas turbine engine comprising:

a compressor section;

a combustor in fluid communication with the compressor section; and a turbine section in fluid communication with the combustor, the turbine section having an airfoil including an airfoil section, and a platform having a non-gaspath side, a flange extending from the non-gaspath side, and a gaspath side from which the airfoil section extends, the flange being comprised of a sandwich composite including first and second ceramic matrix composite (CMC) skins each including at least one 2-D ceramic fiber ply, and a cellular core disposed between the first and second CMC skins, the first and second CMC skins including, respectively, first and second radially upturned tabs extending in the flange, the cellular core including a base portion extending in the platform adjacent the flange and a ridge radially protruding from the base portion and extending between the first and second radially upturned tabs, the base portion having a maximum axial length in the platform and the ridge having a maximum radial thickness at the flange, and the axial length is greater than the radial thickness by a factor of at least 2.

9. The gas turbine engine as recited in claim 8, wherein the sandwich composite includes a third CMC skin including at least one 2-D ceramic fiber ply on the gaspath side of the platform, with the cellular core being radially disposed between the third CMC skin and each of the first and second CMC skins.

10. The gas turbine as recited in claim 8, wherein the cellular core is selected from the group consisting of a ceramic honeycomb, a ceramic foam, a ceramic felt, a monolithic ceramic grid, and combinations thereof.

11. The gas turbine as recited in claim 8, wherein the flange defines a radial flange face, and the ridge defines a radial ridge face that has cells that open at the radial flange face.

12. The gas turbine as recited in claim 11, wherein the radial ridge face is flush with the radial flange face.

13. A method for fabricating an airfoil for a gas turbine engine, the method comprising:

providing a core blank made of a cellular material;

shaping the core blank into a cellular ceramic core;

forming a fiber preform that has an airfoil section and a platform by laying-up first and second ceramic fiber ply skins on the cellular ceramic core such that in a flange on the platform the cellular ceramic core is sandwiched between the first and second ceramic fiber ply skins, the first and second ceramic fiber ply skins each include at least one 2-D ceramic fiber ply, the cellular ceramic core is selected from the group consisting of a ceramic honeycomb, a ceramic foam, a ceramic felt, a monolithic ceramic grid, and combinations thereof;

densifying the fiber preform with a ceramic matrix to make the first and second ceramic fiber ply skins into first and second ceramic matrix composite (CMC) skins; and wherein the first and second CMC skins include, respectively, first and second radially upturned tabs extending in the flange, the cellular core including a base portion extending in the platform adjacent the flange and a ridge radially protruding from the base portion and extending between the first and second radially upturned tabs, the base portion having a maximum axial length in the platform and the ridge having a maximum radial thickness at the flange, and the axial length is greater than the radial thickness by a factor of at least 2.

14. The method as recited in claim 13, wherein the shaping includes machining the core blank.

* * * * *